United States Patent [19]
Bauck

[11] Patent Number: 4,687,923
[45] Date of Patent: Aug. 18, 1987

[54] METHOD FOR DETERMINING THE DIRECTION OF A RADIATION SOURCE

[75] Inventor: Jerald L. Bauck, Urbana, Ill.

[73] Assignee: Motorola, Inc., Schaumburg, Ill.

[21] Appl. No.: 740,449

[22] Filed: Jun. 3, 1985

[51] Int. Cl.⁴ .................................. G01J 1/20
[52] U.S. Cl. .......................... 250/203 R; 126/425
[58] Field of Search ............... 250/203 S, 203 R, 266; 126/425

[56] References Cited

U.S. PATENT DOCUMENTS

| | | | |
|---|---|---|---|
| 3,225,450 | 12/1965 | Stanley | 250/203 R |
| 3,446,970 | 5/1969 | Morkowitz et al. | 250/203 |
| 3,597,620 | 8/1971 | Willman | 250/203 |
| 3,651,326 | 3/1972 | Alpers | 250/203 CT |
| 4,179,612 | 12/1979 | Smith | 250/203 S |
| 4,223,174 | 9/1980 | Moeller | 126/425 |
| 4,278,891 | 7/1981 | Tosswill | 250/203 S |
| 4,297,572 | 10/1981 | Carlton | 250/203 S |
| 4,339,665 | 7/1982 | Utagawa et al. | 250/578 |
| 4,355,896 | 10/1982 | Laue | 250/203 S |
| 4,383,170 | 5/1983 | Takagi et al. | 250/216 |
| 4,410,804 | 10/1983 | Stauffer | 250/578 |
| 4,465,940 | 8/1984 | Graff et al. | 250/578 |
| 4,472,638 | 9/1984 | Nishizawa et al. | 250/578 |
| 4,484,565 | 11/1984 | Mori | 126/425 |
| 4,491,727 | 1/1985 | Appelbaum et al. | 250/203 S |
| 4,495,408 | 1/1985 | Mori | 250/203 S |
| 4,586,488 | 5/1986 | Noto | 250/203 S |

*Primary Examiner*—David C. Nelms
*Assistant Examiner*—William L. Oen
*Attorney, Agent, or Firm*—Eugene A. Parsons

[57] ABSTRACT

A passive radiation bearing (azimuth) sensor including a member having a plurality of radiation detectors mounted in spaced apart relationship therearound and additional structure limiting the receiving field of each detector to a generally conical volume having its apex at the detector. The sensor further includes electronics for determining when the radiation being received has changed from a reference value and which detectors sensed the change, and for calculating from this information whether a transient object is in the field and, if so, its bearing.

5 Claims, 4 Drawing Figures

METHOD FOR DETERMINING THE DIRECTION OF A RADIATION SOURCE

BACKGROUND OF THE INVENTION

The purpose of the invention is to measure the bearing (azimuth), or direction, of transient objects against a static background. The transient objects are detected on the basis of reflected sunlight, radiated infrared, shadows, self illumination (e.g. headlights), lasers, or some other change in the static background caused by the transient object.

In general the prior art is limited to optical trackers which generally include sensors mounted on a gimballed platform, or the like, driven by an output signal from the sensors so that the sensors are continously pointed at the target, or solar collectors which include a relatively large array of sensors that do not change position or in any way indicate the direction of a target. The optical trackers are relatively complicated and expensive to construct and operate. The solar collectors do not provide directional information.

SUMMARY OF THE INVENTION

The present invention pertains to a passive radiation bearing sensor including a generally cylindrical base member having a plurality of radiation detectors mounted thereon in spaced apart relationship with upper and lower parallel plates and radially outwardly extending vanes positioned to limit the receiving field of each detector, and electronic circuitry connected to the detectors for determining the direction from said base member of a change in radiation falling on the detectors.

In one embodiment the electronic circuit stores a measure of static background radiation and periodically compares the instantaneous static background radiation to the stored static background radiation to determine whether a change has occurred. If a change has occurred the electronic circuitry then determines whether the change is a change in the ambient radiation (sunlight, clouds, moonlight, etc.) or is a change due to a transient object. If the change is due to a transient object the electronic circuit then compares the output of each detector to the stored outputs and determines the direction of the transient object from the size of the difference signals derived.

It is an object of the present invention to provide a new and improved passive radiation bearing sensor.

It is a further object of the present invention to provide an improved method of determining the direction of a change in radiation utilizing the improved passive radiation bearing sensor.

It is a further object of the present invention to provide a new and improved passive radiation bearing sensor which is simple and inexpensive to manufacture and operate.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
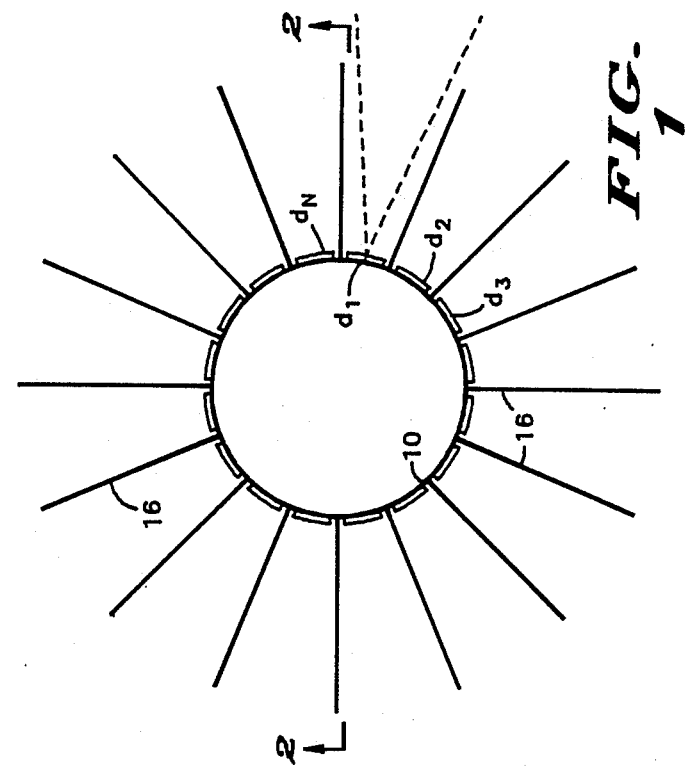
FIG. 1 is a view in top plan, portions thereof removed, illustrating a passive radiation bearing sensor embodying the present invention.
Figure 2:
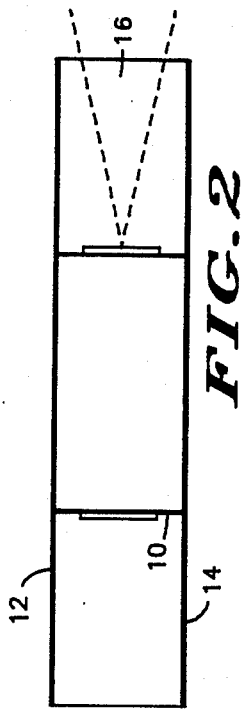
FIG. 2 is a sectional view as seen from the line 2—2 in FIG. 1.

Referring to FIGS. 1 and 2, the number 10 designates a generally cylindrically shaped base, which in this embodiment has a circular cross section. It will of course be understood that the base 10 can be any member upon which it is desired to mount the various components of a passive radiation bearing sensor. A plurality of radiation detectors $d_1$ through $d_n$ are mounted on body 10 in spaced apart relationship about the outer periphery thereof. Detectors $d_1$–$d_n$ may be any of the well-known devices which provide an electrical output in response to the reception of light waves thereon. In general, different light waves, e.g. infrared, visible, ultraviolet, require different sensors and each of the detectors described herein could be a sensor designed to receive a single one of the different light waves or a combination of devices designed to receive any portion of the spectrum, up to and including the entire spectrum. A pair of parallel, spaced apart plates 12 and 14 are placed at each end of body 10 and a plurality of radially extending vanes 16 are affixed to the body 10 between plates 12 and 14 with a vane 16 between each adjacent pair of detectors. Thus, the plates 12 and 14 and the vanes 16 restrict the receiving field of each of the detectors $d_1$–$d_n$ to a radially outwardly directed, generally conically shaped (wedge shaped) volume having an apex at the detector (see doted lines in FIGS. 1 and 2).

Figure 3:
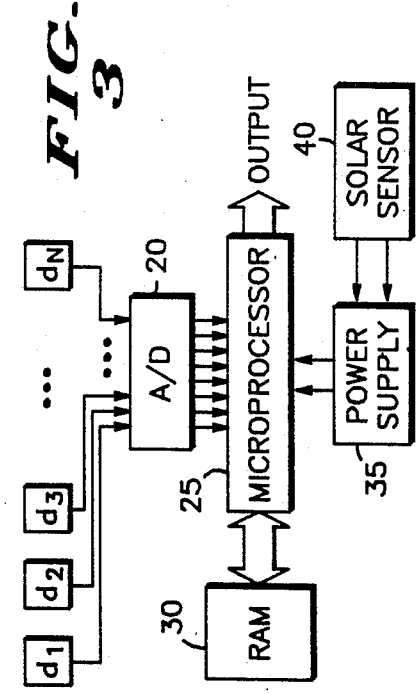
FIG. 3 is a block diagram of electronic circuitry utilized in connection with the sensor of FIG. 1.

Referring to FIG. 3, a block diagram of an electronic circuit utilized in conjunction with detectors $d_1$–$d_n$ is illustrated. The electronic circuitry is utilized to determine the bearing, or direction from base member 10, of a transient object. The electrical outputs of detectors $d_1$–$d_n$ are applied to an analog to digital converter 20 and the resultant digital signals are supplied to a microprocessor 25. A random access memory (RAM) 30 is interconnected with microprocessor 25. A power supply 35, which may be for example a rechargeable battery, is connected to supply power to the electronic circuit. A solar sensor 40 is illustrated as an option in this embodiment and may be connected to the power supply 35 to recharge the battery during extended periods of use. The solar sensor 40 consists of one or more solar cells that convert solar energy directly to electrical energy and these cells may be mounted, for example, on the upper surface of upper plate 12. In many instances the solar sensor would not be desirable because of its high visibility; however, there are applications in which visibility is not important and the extended life provided may be necessary.

In the present embodiment base 10 has a hollow interior designed to receive the electronic circuitry described. To facilitate connections and to reduce the cost of the overall structure, portions of base 10 and/or plates 12 and 14 can be formed of printed circuit material with the various components, including detectors $d_1$–$d_n$, affixed directly thereto. Many other packaging techniques may be utilized to further reduce the complexity, size and cost of the passive radiation bearing sensor.

In the operation of the passive radiation bearing sensor, the detectors $d_1$–$d_n$ are sampled periodically and provide an indication of the ambient or background light. As a transient object, such as a vehicle or the like, passes by the sensor, the light changes. The transient object may provide additional light, e.g. with headlights, reflected sunlight, lasers, or radiated infrared, or the transient object may reduce or increase the light falling on the sensor. In some instances the transient object might change a characteristic of the light, e.g. color, without substantially changing the intensity. When such a change is expected, filters can be used with the detectors to produce a change in intensity with the character change. Microprocessor 25 is programmed to sense a change in the light and to determine whether the change is caused by a change in the ambient light (e.g. the overhead passage of the sun from the east to the west) in which case most of the detectors $d_1$–$d_n$ will be affected, or whether only a few (e.g. 1–3) of the detectors $d_1$–$d_n$ are affected, in which case the change is due to a transient object. Once microprocessor 25 determines that the change is caused by a transient object, additional calculations are performed to determine the exact direction of the transient object relative to base 10 and, if desired, this calculation may be made at several intervals to determine the direction of movement of the transient object. It will of course be understood that specific hardware might be utilized in place of microprocessor 25 but, because of the reduced expense and the greatly extended capabilities provided by a microprocessor, this embodiment is preferred.

While a variety of specific methods might be utilized to determine whether changes in static background are caused by ambient lighting changes or transient objects, the following method is preferred because of its simplicity. The N detector outputs are thought of as forming an N-dimensional vector. The N detectors are sampled to provide a reference static background of the surroundings, which reference is defined as the vector $\underline{r}$.

Where:

$$\underline{r} = [r_1, r_2, r_3, \ldots r_N]^T \tag{1}$$

and the superscript T indicates the matrix transpose. Next, the vector $\underline{r}$ is normalized to account for the variable ambient lighting level. The vector $\underline{r}$ is normalized by dividing it by its length.

Where the length is equal to:

$$\underline{r} = (r_1^2 + r_2^2 + \ldots + r_N^2)^{\frac{1}{2}} \tag{2}$$

Thus, $$\underline{r}' = \frac{\underline{r}}{\|\underline{r}\|} \tag{3}$$

The normalized reference $\underline{r}'$ is stored in RAM 30 for future use.

With the normalized reference vector calculated and stored in RAM 30 the detectors are sampled periodically with each complete sampling of all of the detectors considered as an instantaneous vector $\underline{v}_i$. The instantaneous vector is also normalized by dividing it by its length:

$$\underline{v}_i' = \frac{\underline{v}_i}{\|\underline{v}_i\|} \tag{4}$$

At this point, the length of the instantaneous vector can be used as a test to determine whether the operation should continue. For example, in many applications it may be desirable to utilize the bearing sensor only during daylight hours. In this application a threshold may be provided which is an indication of the minimum amount of static background light that will be acceptable for operation. The length of the instantaneous vector can be compared to the minimum threshold and, if it is not exceeded, the entire bearing sensor can be turned off for a predetermined period of time, e.g. 2 hours, to save the battery. Conversely, if it is desired to use the bearing sensor only in the evening, a threshold indicative of a maximum amount of static background light can be provided and the length of the instantaneous vector then must not exceed the threshold value.

Assuming the minimum threshold has been reached (or is not used), each time a normalized instantaneous vector is obtained, the dot product of the normalized reference vector and the normalized instantaneous vector is calculated. The dot product of two vectors is essentially a zero-lag correlation function and actually compares the similarity between the two vectors. The more similar the vectors, the greater the product will be. Since the length of the normalized vectors is 1, the maximum value that the dot product can be is 1. This product will occur if the 2 vectors are substantially similar. Since the detector outputs are represented as positive numbers (there can be no negative light), the minimum value that the dot product can be is 0. As changes occur in the instantaneous vector, the length of the dot product becomes smaller. Thus, to determine whether a change in the background has occurred a threshold $T_1$ is established with a value slightly less than 1, e.g. 0.99. The dot product of the two vectors is compared to the threshold as follows:

If $$\underline{v}_i' \cdot \underline{r}' \geq T_1 \tag{5}$$

then there has been no change in the backround. Continue sampling the detectors $d_1$–$d_n$.

If $$\underline{v}_i' \cdot \underline{r}' < T_1 \tag{6}$$

then there has been a change in the background.

There are two possible reasons for the change in the background. The change may be due to a change in the ambient light caused by the passage of the sun overhead, or transient cloud cover, etc. The second possibility is that the change in background may be due to a transient object passing through the receiving fields of the detectors.

To determine whether the change in static background is caused by ambient light changes or by a transient object, a new vector $u_i$ is formed by calculating the difference between the reference vector and the instantaneous vector, and then taking the absolute value of each resulting component:

$$\underline{u}_i = [|r_1 - v_{i1}|, |r_2 - v_{i2}|, - - -, |r_N - u_{iN}|]^T \tag{7}$$

The new vector $\underline{u}_i$ is then normalized $$\underline{u}'_i = \frac{\underline{u}_i}{\|\underline{u}_i\|} \tag{8}$$

The vector $\underline{u}_i'$ is then correlated, or it is compared in similarity with, a vector $\underline{a}$ in which each component of the vector is 1. Thus, $$\underline{a} = [1, 1, 1, \ldots 1]^T \tag{9}$$

As before, the comparison is performed by performing the dot product of the two vectors. If the change in background is due to a change in ambient light, which change will affect most of the detectors $d_1$-$d_n$, the dot product of these two vectors will be relatively large. If the change in background is due to a transient object, which change will affect only a few (e.g. 1-3) detectors, the dot product of these two vectors will be less. Thus, a threshold $T_2$ is established which effectively differentiates between a change in ambient light and a transient object, by determining the number of detectors effected. The following comparisons can be made.
If $$\underline{u}_i' \cdot \underline{a} \geq T_2 \tag{10}$$

there is no transient object, continue sampling detectors $d_1$-$d_n$.
If $$\underline{u}_i' \cdot \underline{a} < T_2 \tag{11}$$

there is a tansient object in the field of the sensor, continue process.

Here it is appropriate to note that in many instances large changes in the static background may occur, which changes are relatively permanent, for example, a change from a sunny to a cloudy day, or vice versa. To allow for these situations, a third threshold $T_3$ may be established, where $T_3$ is less than $T_1$. If the length of the dot product of the normalized reference vector and the normalized instantaneousvector is less than $T_3$ and no transient object is detected in accordance with inequality 11 above, then the ambient lighting conditions have changed appreciably and a new reference vector is required. In this situation the latest normalized instantaneous vector is stored and utilized as the normalized reference vector. The process then continues by sampling the detectors and providing a new instantaneous vector.

Once it is determined that there is a transient object in the field of the sensor, in accordance with inequality 11 above, the individual components of the normalized instantaneous vector are compared to the individual components of the normalized reference vector to provide a difference vector $\underline{d}$, where $$\underline{d} = \underline{v}_i' - \underline{r}' \tag{12}$$

Figure 4:
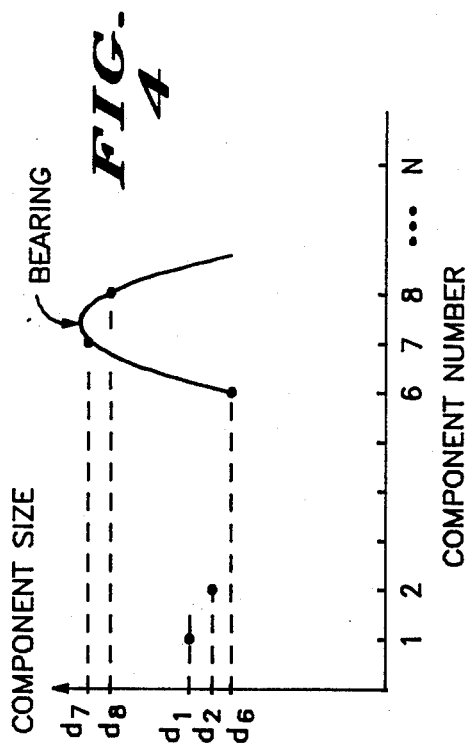
FIG. 4 is a graphic illustration of the mathematical parobola fitting.

Thus, the vector $\underline{d}$ has N components which are equal to the difference between the N components of the normalized instantaneous vector minus the N components of the normalized reference vector. The largest component, in absolute value, of the $\underline{d}$ vector is determined and a vertical parobola is fitted, mathematically, through it and each adjoining component, as illustrated graphically in FIG. 4. For example, if the component $d_7$ is determined to be the largest, the adjoining components $d_6$ and $d_8$ would be utilized with component $d_7$. Once the parobola is fitted to incorporate the three components, it is mathematically operated on, e.g. differentiated, to find its extreme point, which corresponds to the transient object's bearing. While the largest component could be directly associated with a detector (e.g. component $d_7$ could be directly attributable to detector $d_7$) and the approximate bearing of the transient object could be determined from the position of the associated detector on member 10, this method is relatively rough and the use of the parabola greatly improves the accuracy. It will of course be understood that utilizing a parabola is simply one method of determining the bearing accurately and that many other interpolation methods might be utilized by those skilled in the art. In addition, any of a number of tracking or filtering methods may be used to improve the bearing estimate, e.g., Kalman filter or least squares estimater.

It will be understood by those skilled in the art that a variety of modifications might be performed to alter directional sensitivity, mathematical calculations, etc. For example, a two tiered bearing sensor might be utilized wherein one of the tiers incorporates fewer detectors or transient objects of larger angular extent and one of the tiers incorporates a larger number of detectors for transient objects of smaller angular extent. In a still further modification the tiers might be arranged to sense objects in two dimensions, or the vanes might be arranged in a two-dimensional array.

Also, the two tiered arrangement might be utilized to reduce the number of components being operated upon until a transient object is determined, at which time the tier with the greater number of detectors could be activated for greater directional sensitivity. Also, it will be understood that the radial length of the vanes 16, the size of the circumference of member 10, and the number of detectors can be varied to alter the fields of view of each detector and, thereby, change the directional sensitivity. It should also be understood that digital circuitry is disclosed to simplify the circuitry and utilize a microprocessor. However, if less accurate calculations are required, a completely analog circuit might be utilized. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A method of determining the bearing of a source of optical radiation comprising the steps of:

providing an optical sensor including a base member having a plurality of optical detectors mounted thereon in spaced apart relationship with each detector having an optical radiation receiving field and producing an output in response to the reception of optical radiation within the field, and further structure mounted on the base member to restrict the receiving field of each detector to a radially outwardly directed, generally conical volume having an apex at the detector;

developing a reference function from the outputs of each of the detectors;

periodically developing an instantaneous function from the outputs of each of the detectors; and comparing the instantaneous function to the reference function to determine when a change in optical radiation in the field of at least one detector occurs.

2. A method as claimed in claim 1 including in addition the step of comparing an instantaneous output of each detector to a reference output of each detector when a change in optical radiation occurs.

3. A method as claimed in claim 2 including in addition the step of finding the comparison between instantaneous and reference outputs which is largest in absolute value, mathematically fitting a vertical parobola through the largest comparison found and through the adjacent comparisons on each side, and mathematically differentiating the parabola to determine its extreme point, the target bearing.

4. A method as claimed in claim 2 further including the step of determining approximately the number of detectors effected when a change in optical radiation occurs.

5. A method of determining the bearing of a source of radiation comprising the steps of:

providing a radiation sensor including a base member having a plurality of radiation detectors mounted thereon in spaced apart relationship with each detector having a radiation receiving field and producing an output in response to the reception of radiation within the field, and further structure affixed to the base member to restrict the receiving field of each detector to a radially outwardly directed, generally conical volume having an apex at the detector;

developing a reference function from the outputs of each of the detectors;

periodically developing an instantaneous function from the outputs of each of the detectors;

comparing the instantaneous function to the reference function to determine when a change in received radiation has occurred and which detector outputs have changed;

determining that a transient object is in a receiving field when the number of detector outputs is less than a predetermined number; and utilizing the changed detector outputs to approximate the direction of the transient object from the radiation sensor.

* * * * *